United States Patent Office 2,848,874
Patented Aug. 26, 1958

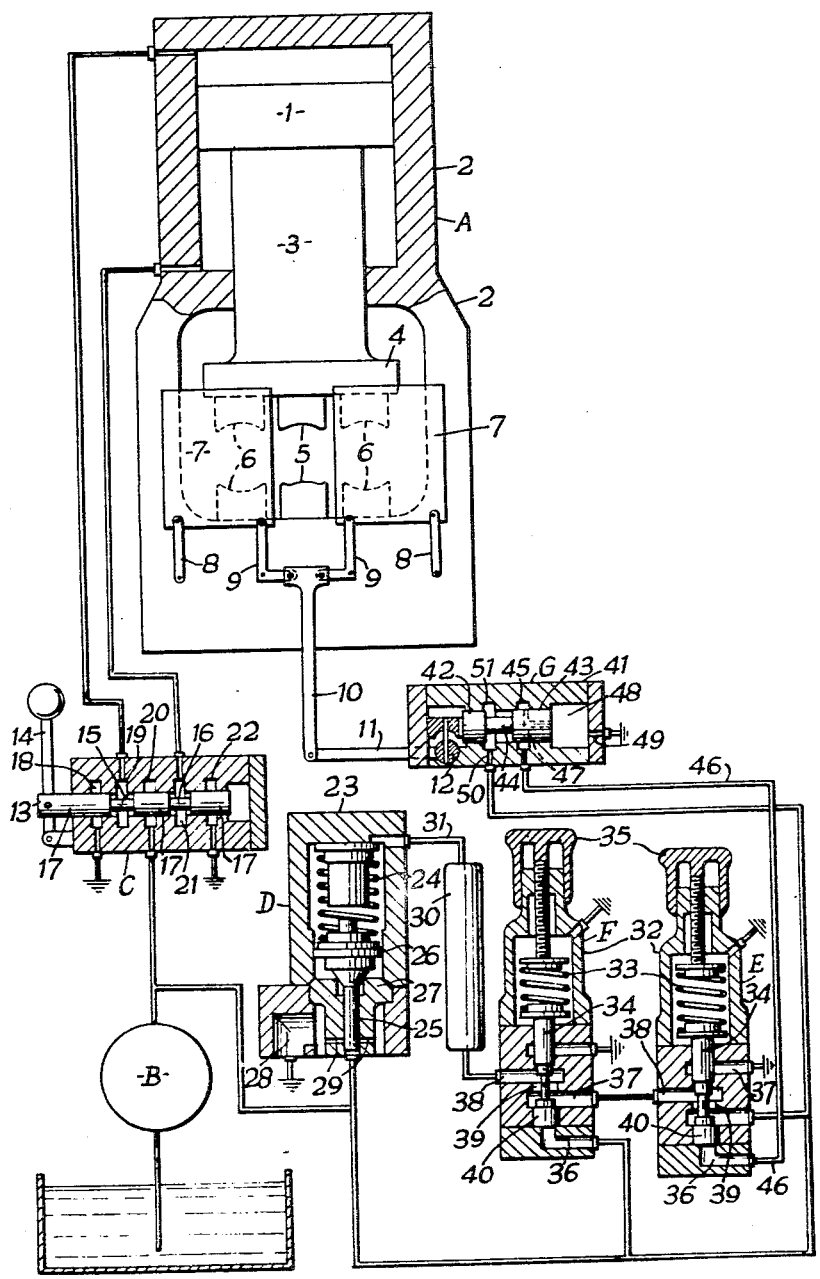

2,848,874

CONTROL VALVES FOR HYDRAULIC PRESSES

John Maurice Towler, Mayfair, London, England, assignor to Electraulic Presses Limited, Rodley, near Leeds, England, a British limited-liability company Application December 8, 1954, Serial No. 473,896

Claims priority, application Great Britain December 14, 1953

2 Claims. (Cl. 60—52)

This invention relates to improvements in or relating to means for controlling the pressure in a hydraulic system of the kind in which the system is supplied with liquid from a constant source of supply such, for example, as an accumulator or a continuously running pump.

The pressure in hydraulic systems of the above kind is normally controlled by an adjustable spring loaded relief valve and said pressure will be fixed at the figure at which the relief valve is preset. To change the pressure it is necessary to reset the relief valve by manually adjusting the spring load.

Where a hydraulic press is required to operate at the same pressure for prolonged periods the above means for changing the pressure in the system is satisfactory but if as frequently is the case the press is required to operate at a different pressure on alternate working strokes or after the execution of a relatively small number of working strokes it is impracticable correspondingly to vary the pressure in the system by the above simple means.

The object of the present invention is the provision of means for controlling the pressure in a hydraulic system which will enable such pressure to be changed quickly or instantly by manual or automatic operation of a further valve which functions to control the load on the relief valve.

Broadly the present invention consists in means for controlling the pressure in a hydraulic system which is supplied with liquid from a constant source of supply such, for example, as an accumulator or a continuously running pump, said means comprising in combination a relief valve the valve member of which on one side is permanently open to the pressure in the system and on the opposite side is loaded to resist its opening movement by the combined pressures of a spring or other mechanical load and hydraulic pressure, at least two master valves set to different pressures and adapted to pass pressure liquid from the system to load the relief valve up to the pressure at which it is set, a by-pass valve having a valve member which when moved in one direction will act to cut in the master valve which is set at the lower pressure whereby the relief valve will be loaded to maintain the system at the lower pressure and when moved in another direction will act to cut out the master valve of lower pressure whereby the relief valve will be hydraulically loaded through the instrumentality of the master valve of higher pressure to maintain the system at said higher pressure, and a control valve for rendering the hydraulic liquid in the system available for the operation of a hydraulic press or other hydraulic motor at either pressure.

In means according to a preferred embodiment of the invention the hydraulic load on the valve member of the relief valve is a liquid spring consisting of a body of liquid held partly within the return spring casing of the relief valve and partly within a vessel separate from but hydraulically connected to said spring casing, or wholly within the spring casing, said casing and vessel or said casing holding a predetermined volume of liquid which is capable of being compressed by the valve member of the relief valve to allow said member to open when the pressure in the hydraulic system reaches a predetermined pressure.

In this preferred embodiment the pressure of the liquid within the liquid spring is controlled by the master valves in such manner that when the master valve which is set at the lower pressure is in operation the liquid within the liquid spring will be open to the pressure within the system until it reaches the pressure at which the master valve is set when the valve member of said master valve will close and isolate the liquid spring from the pressure in the system and permit the relief valve to open under increasing pressure in the hydraulic system and when said master valve which is set to close at the lower pressure is cut out by operation of the by-pass valve the pressure within the liquid spring and the pressure within the system at which the relief valve will open will be under the control of the other master valve which is set to close at the higher pressure.

Operating the by-pass valve to vary the maximum pressure to be maintained in the hydraulic system may either be effected by the hand of the operator or it may be effected automatically by the actuation of means on the hydraulic press or other hydraulic motor receiving pressure liquid from the hydraulic system for the purpose of performing a function which is directly related to the work to be performed by said press or motor so that the maximum pressure in the hydraulic system available for actuating the press or motor will be suitably and automatically varied.

In order that the invention may be clearly understood and carried into effect one practical application of the same will hereinafter be described by the aid of a schematic drawing which accompanies this specification.

In the abovementioned practical application the control means of the present invention is described in conjunction with a hydraulic press for forging and forming metals and other materials having more than one set of forming tools and by means of which the material is progressively formed by removing it from one set of forming tools to the next in a series of tools disposed in a row.

In the example illustrated the final forming operation which requires maximum force is performed on a set of tools forming the middle set in a row of three, said middle set being located directly under the press ram so as to subject the press frame to the least strain, and the other operations requiring less force are performed on the tools on either side of the set of tools requiring the maximum force. In this example the valve member of the by-pass valve is operatively connected to guards which are movable into and out of a position where they screen the two outer sets of tools from use, the arrangement being such that displacement of the guards to expose the outer sets of tools for use moves the by-pass valve member to a position in which the pressure in the hydraulic system available to operate the press ram is controlled by the master valve which is set to close at the lower pressure. Movement of the guards in the opposite direction to screen the outer sets of tools from use moves the by-pass valve member to the position where the lower pressure master valve is cut out and the other or higher pressure master valve acts to control the pressure in the hydraulic system.

The complete hydraulic system constituting the above example of a practical application of the invention and shown schematically in the accompanying drawings includes a down stroking hydraulic press A, a source of fluid under pressure which may be an accumulator or a continuously running pump B for supplying liquid under pressure to the system, a control valve C for opening the press cylinder to the pressure liquid in the system on opposite sides of the ram piston alternatively, a relief valve D which opens to release liquid from the system when said liquid is at a predetermined pressure, master control valves E and F set to pass pressure liquid from the system to load the relief valve alternately at different pressures with the master valve E set to open at the lower pressure, and a by-pass valve G adapted when suitably operated to render the master valve E inoperative and the other master valve F operative.

In the example illustrated the press A has a piston 1 working in a cylinder 2 and this piston forms the upper end of a ram 3. On the lower end of the ram is a tup 4 and this is fitted with the upper halves of three sets of forming tools disposed in a row with the middle set of tools 5 located directly under the centre of the press ram and the outer sets of tools 6 arranged one on each side of the middle set.

The outer sets of tools 6 are screened from use by laterally movable guards 7 and these guards are supported on pivoted links 8 and bell-crank levers 9. These bell-crank levers engage with their inner ends a link 10 and said link at its lower end is pivotally attached to the outer end of a lever 11. The opposite end of the lever 11 engages the valve spindle of the by-pass valve G through a cranked connection 12.

When the guards 7 in the above construction are moved apart to expose for use the outer sets of tools 6 the outer end of the lever 11 will be lifted and the by-pass valve spindle will be moved to the right in the drawing.

Pressure liquid from the system for operating the press is distributed to opposite sides of the piston 1 alternatively by means of the control valve C. This valve, in the illustrated example has its valve spindle 13 manually operable through a hand lever 14 and said valve spindle 13 has two portions 15 and 16 of reduced diameter separating three portions 17 of full diameter whilst the bore in which the spindle is mounted to slide has five enlargements forming with the valve spindle five annular chambers 18, 19, 20, 21, and 22. The two outer chambers 18 and 22 are connected to exhaust, the intermediate chambers 19 and 21 are connected to the ends of the press cylinder on opposite sides of the piston 1 and the central chamber 20 is permanently open to the pressure liquid in the system.

With the control valve spindle in its mid-position as shown the intermediate chambers 19 and 21 are isolated both from the outer or exhaust chambers 18 and 22 and the central or pressure chamber 20 by means of the full diameter portions 17.

If the control valve spindle is moved to the left of the mid-position in the drawing, chamber 21 will be opened to the central chamber 20 and pressure liquid will flow to the lower end of the press cylinder and beneath the piston 1, and the press cylinder on the upper side of the piston will be open to exhaust through chambers 19 and 18.

The above will effect the upward or return stroke of the press ram. The downward or power stroke will be similarly made if the control valve spindle is moved to the right in the drawing as this will cause pressure fluid to flow into the press cylinder above the piston 1 by way of chamber 19 and the lower end of the cylinder on the underside of the piston will be opened to exhaust by way of chambers 21 and 22.

Alternatively the control valve spindle may be automatically operated by pressure liquid forming the discharge from the relief valve D so that the press ram is automatically reversed when a predetermined force has been applied to the work.

The relief valve D as shown in the drawing has a casing 23 the interior of which at its upper end contains a light spring 24 and forms part of the predetermined capacity of a liquid spring, the remainder of said capacity being provided by the interior of a separate but connected sealed vessel hereafter to be described.

The light spring 24 urges to its closed position a valve plunger 25 by pressing against the upper side of a piston 26 mounted on the upper end of the valve plunger. The piston 26 is a sliding fit within a bore forming an extension of the interior of the casing 23 at its lower end and the plunger 25 is a liquid tight sliding fit in a bore provided for its reception in a member 27 forming a closure for the lower end of the casing 23.

The member 27 is suitably reduced to form a surrounding annular chamber which is permanently open to exhaust through an outlet 28 and which communicates with the interior of the bore containing the plunger 25 by radial holes 29. These radial holes are closed by the plunger 25 in the valve closed position and are opened when the plunger is forced upwards to the valve open position by the rising pressure of the liquid within the system acting on the permanently exposed area of the lower end of the plunger, thereby to open the system to exhaust when the pressure has risen to a predetermined figure.

The load acting to hold the relief valve in the valve closed position is made up of the pressure of the light spring 24 and the pressure of the liquid within the capacity constituting the aforesaid liquid spring. The pressure maintained in the system will therefore correspond to the above load on the relief valve and this is changed by correspondingly varying the pressure within the aforesaid liquid spring. This pressure is controlled by the master valves E and F.

In the example illustrated the predetermined capacity for the liquid constituting the liquid spring consists of the joint capacities provided by the interior of the casing 23 above the valve piston 26 and the interior of a sealed vessel 30 which is a separate unit but connected to the valve casing by a pipe 31. The total capacity provided by the connected interior spaces of the valve casing and the sealed vessel 30 is predetermined to hold a contained volume of liquid which may be compressed to permit the valve plunger 25 to be forced by the pressure of the liquid in the system to the valve open position where the radial holes 29 are thereby uncovered when said contained volume of liquid is at a pressure substantially equivalent to the normal pressure in the system.

The liquid contained within the aforesaid capacity for providing a liquid spring is supplied by the system under the control of either of the master valves E and F according to the pressure at which the liquid within the system is required to be maintained.

The two master valves may be identical in construction as shown and be composed of a casing 32 housing a spring 33 for loading the valve spindle 34, a screw cap 35 for varying the compression of the spring and therefore the load on the valve spindle, an inlet 36 for the admittance of pressure liquid from the system to the lower or outer end of the valve spindle, a further inlet 37 at one level and an outlet 38 at a higher level which are connected by a normally open passage 39 that is closed by the full diameter portion 40 on the valve spindle 34 when the valve spindle is lifted to the valve closed position by pressure of the liquid in the system acting against its lower or outer end.

When the master valves E, F, are arranged in the system as shown in the drawing pressure liquid from the system will flow into the sealed vessel and the interior of the relief valve casing 23 by way of inlet 37 and outlet 38 of valve E to inlet 37 of valve F and out through outlet 38 of the same valve to vessel 30. The relief valve D will thus be held closed until the pressure in the system rises to a figure at which the spring load on the valve spindle of master valve E can be overcome. When this pressure is reached the valve spindle of master valve E will lift and isolate outlet 38 from the inlet 37.

Pressure liquid to the sealed vessel 30 will thus be cut off. In consequence the pressure of the liquid contained by the capacity composing the liquid spring will cease to rise, but as the relief valve remains closed the pressure within the system will continue to rise until it reaches the figure where the valve plunger 25 of the relief valve can compress the liquid spring and lift until the holes 29 are opened when liquid from the system will be free to exhaust through outlet 28 until the pressure in the system falls and permits the plunger 25 to close the holes 29. The pressure of the liquid in the system will thus be maintained at a figure as determined by the setting of the master valve E which is lower than the figure for which the other master valve F is set.

The admittance of pressure liquid from the system to the underside of the valve plunger of the lower pressure master valve E is controlled by the by-pass valve G. This by-pass valve consists of a casing 41 in which is movably mounted a valve member in the form of a plunger having portions 42 and 43 of full diameter separated by a portion 44 of reduced diameter.

In the bore containing the valve plunger and surrounding the portion 43 of full diameter is an annular recess 45 which is connected to the inlet 36 of master valve E by a pipe 46.

The plunger within the portion 43 is drilled to provide passages 47 which connect the annular recess 45 to a space 48 at the outer end of the valve bore when the plunger is fully retracted to the left as shown in the drawing which space is permanently open to exhaust by way of an outlet 49. Thus with the by-pass valve plunger in the position shown the inlet 36 of master valve E is at atmospheric pressure thus rendering this valve inoperative.

Pressure liquid from the system enters the bore of the by-pass valve G through an inlet 50 opening into an annular recess 51 surrounding the reduced portion 44 of the valve plunger. The recess 51 and the reduced portion 44 are proportioned so that when the valve plunger is moved to the right in the drawing the said reduced portion will connect the inlet 50 to the annular recess 45 thus permitting pressure liquid to flow to the inlet 36 of master valve E to act upon the underside of the portion 40 of its valve spindle. The arrangement is therefore such that with the valve plunger of the by-pass valve G in the position shown in the drawing master valve E is rendered inoperative and the relief valve D will be loaded at the higher pressure through the instrumentality of the master valve F and with the valve plunger of the by-pass valve displaced to the right in the drawing the relief valve D will be loaded at the lower pressure through the instrumentality of the master valve E, the other master valve F being unaffected owing to the same having been set to operate at a higher pressure than the valve E.

With the guards 7 in the arrangement illustrated screening the outer sets of tools 6 so that use can only be made of the middle set of tools 5 the pressure in the system available to operate the press will be at the higher level and under the control of the master valve F. The action of moving the guards laterally to expose the outer sets of tools 6 for use effects displacement of the valve plunger of the by-pass valve G to the right of the illustrated position thus automatically to produce a reduction in the pressure in the system available to operate the press by causing master valve E to function to control said pressure.

The embodiment described and illustrated may be modified in some respects without departing from the invention. For instance the control valve C may be adapted so that it is operated by the discharge from the relief valve D whereby the press ram is automatically reversed when a predetermined force has been applied to the work. Again the valve plunger of the by-pass valve G may be actuated automatically through levers and links or by hydraulic servo mechanism or electrically or by a suitable combination of such means or it may be operated manually.

What is claimed is:

1. In a hydraulic system, in combination, a pressure fluid operated actuator, a source of fluid under pressure, a valve controlling the delivery of fluid from said source to said actuator, a relief valve having a movable member controlling communication between an inlet port and an exhaust port and having one end extending into a closed chamber, said member having an area at one end exposed to the pressure prevailing at said inlet port and an area at the opposite end exposed to the pressure prevailing in said chamber, conduit means connecting said fluid source to said inlet port, a spring in said chamber urging said member in a direction to close said inlet port from said exhaust port, other conduit means connecting said fluid source with said chamber, a first pressure responsive valve in said other conduit means operable to interrupt the supply of fluid to said chamber and to trap the fluid therein when the pressure reaches a predetermined value, a second pressure responsive valve in said conduit means operable to interrupt the supply of fluid to said chamber and to trap the fluid therein when the pressure reaches a different predetermined value, and valve means operative to condition said pressure responsive valve for operation selectively, said chamber being dimensioned to hold a predetermined volume of fluid compressible to permit sufficient movement of said valve member to vent the fluid source to exhaust when the fluid in the system reaches a predetermined pressure.

2. A hydraulic system as defined in claim 1 in which the fluid operated actuator constitutes the working cylinder and ram of a hydraulic press and in which means is provided for actuating the valve means controlling the pressure responsive valves in accordance with the work to be performed by the ram.

References Cited in the file of this patent

UNITED STATES PATENTS

| 747,749 | Morgan | Dec. 22, 1903 |
| 1,459,162 | Ruggiero | June 19, 1923 |
| 1,727,820 | Greve | Sept. 10, 1929 |
| 1,851,502 | Ferris | Mar. 29, 1932 |
| 1,888,332 | Summey | Nov. 22, 1932 |
| 2,103,984 | Indge | Dec. 28, 1937 |
| 2,318,851 | Griffith | May 11, 1943 |
| 2,617,389 | Munschauer | Nov. 11, 1952 |